United States Patent [19]
Bakx et al.

[11] Patent Number: 5,303,217
[45] Date of Patent: Apr. 12, 1994

[54] OPTICAL RECORDING DEVICE WHEREIN RECORDING BEAM INTENSITY IS SET IN ACCORDANCE WITH AN OPTIMUM VALUE OF THE DC COMPONENT OF A RECORDED SIGNAL

[75] Inventors: Johnannes L. Bakx; Johannes G. F. Kablau, both of Eindhoven, Netherlands

[73] Assignee: U. S. Philips Corporation, New York, N.Y.

[21] Appl. No.: 929,843

[22] Filed: Aug. 13, 1992

Related U.S. Application Data

[63] Continuation of Ser. No. 491,399, Mar. 8, 1990, abandoned, which is a continuation-in-part of Ser. No. 453,547, Dec. 20, 1989, Pat. No. 5,105,413.

[30] Foreign Application Priority Data

Jun. 23, 1989 [NL] Netherlands ............. 8901591

[51] Int. Cl.5 .................. G11B 7/00
[52] U.S. Cl. .................. 369/48; 369/54; 369/116
[58] Field of Search ............. 369/116, 121, 122, 54, 369/58, 48, 111, 59, 106, 44.38, 110, 44.11; 250/205, 201.5

[56] References Cited

U.S. PATENT DOCUMENTS

| 4,225,873 | 9/1980 | Winslow | 369/54 |
| 4,363,116 | 12/1982 | Kleuter et al | 369/44 |
| 4,380,015 | 4/1983 | Ito et al. | 369/116 |
| 4,456,914 | 6/1984 | Winslow | 369/54 |
| 4,488,277 | 12/1984 | McFarlane et al. | 369/48 |
| 4,516,242 | 5/1985 | Yokota | 369/116 |
| 4,549,288 | 10/1985 | Chan | 369/48 |
| 4,583,210 | 4/1986 | Winslow | 369/54 |
| 4,611,318 | 9/1986 | Winslow | 369/54 |
| 4,631,713 | 12/1986 | Romeas et al | 369/54 |
| 4,677,606 | 6/1987 | Ogata et al | 369/48 |
| 4,717,971 | 1/1988 | Sawyer | 369/34 |
| 4,901,300 | 2/1990 | Van Der Zande et al | 369/47 |
| 4,932,017 | 6/1990 | Van Uijen | 369/48 |
| 4,933,923 | 6/1990 | Veenis et al. | 369/44.11 |
| 4,935,913 | 6/1990 | Shinoda | 369/54 |
| 4,943,861 | 7/1990 | Lambert | 358/345 |
| 4,949,331 | 8/1990 | Maeda et al. | 369/111 |
| 5,065,388 | 11/1991 | Roth et al | 369/47 |
| 5,072,435 | 12/1972 | Bakx | 369/48 |
| 5,105,413 | 4/1972 | Bakx | 369/54 |

FOREIGN PATENT DOCUMENTS

AUB513008 11/1978 Australia .
AUB513376 11/1978 Australia .
109130 5/1984 European Pat. Off. .
59-193544 11/1984 Japan .

Primary Examiner—W. R. Young
Assistant Examiner—Thang V Tran
Attorney, Agent, or Firm—Richard A. Weiss

[57] ABSTRACT

In an optical recording device wherein an information signal is recorded in digital form as recording areas and intermediate areas, an optimum write beam intensity is determined. The resulting recorded pattern is then read, and the read-out signal is analyzed to derive an analysis signal ($V_a$) indicative of deviation of the DC component of the read signal from an optimum level in relation to the minimum and maximum levels of the read signal, which optimum level is defined by the duty cycle of the information signal. At such optimum level the average ratio of the lengths of the recording areas to the intermediate areas will correspond to the duty cycle of the information signal. The write beam intensity is then adjusted to reduce such deviation.

20 Claims, 9 Drawing Sheets

OPTICAL RECORDING DEVICE WHEREIN RECORDING BEAM INTENSITY IS SET IN ACCORDANCE WITH AN OPTIMUM VALUE OF THE DC COMPONENT OF A RECORDED SIGNAL

This is a continuation of application Ser. No. 07/491,399, filed Mar. 8, 1990 and now abandoned, which is a continuation-in-part of application Ser. No. 07/453,547, filed Dec. 20, 1989 and which issued as U.S. Pat. No. 5,105,413 on Apr. 14, 1992.

BACKGROUND OF THE INVENTION

The invention relates to a recording device for recording on a radiation-sensitive record carrier; and it relates, more particular, to recording an information pattern including recording areas having first optical properties which alternate with intermediate areas having second optical properties. The recording device comprises an optical write head including a scanner for scanning the record carrier with the air of a write beam; a modulator for switching the intensity of the write beam, in conformity with a bivalent signal of a specific duty cycle, between a low write intensity, which does not bring about a change in optical properties of the record carrier at the scanning location, and a high write intensity, which brings about an optically detectable change of the record carrier at the scanning location; an optical read head, including a scanner for scanning the information pattern, thus formed, with the aid of a read beam, the read beam being modulated by the information pattern being scanned, a radiation sensitive detector for converting the modulated read beam into a corresponding read signal; an analysis circuit for deriving from the read signal an analysis signal which indicates the deviation of the average ratio between the length of the recording areas and the intermediate areas relative to an optimum ratio defined by the duty cycle; and a circuit for setting the write intensity, depending on the analysis signal, to a value for which the ratio between the lengths of the recording areas and the intermediate areas substantially corresponds to the optimum ratio defined by the duty cycle.

The invention further relates to an analysis circuit for use in such a recording device. A recording device the type as described in the preceding paragraph is known, inter alia from U.S. Pat. No. 4,225,873. The prior art recording device is employed for recording signals whose average duty cycle is 50%. The magnitude of the 2nd-harmonic signal component of such signals indicates the extent to which the average ratio between the lengths of the recording areas and intermediate areas deviates from the optimum ratio defined by the duty cycle, which in that case is unity. Depending upon the magnitude of the detected 2nd-harmonic signal component, the write-intensity for a prior art recording device is set to a value for which this component is substantially zero. A drawback for such a write intensity control is that it cannot be employed for recording processes in which the width of the recording areas recorded within a recording zone is not constant but varies, as is often the case, for example, in thermal recording processes, where the width of the recording zone is larger at the end of the recording than at the beginning. When an information pattern comprising recording areas of varying width is read, this width variation gives rise to a comparatively large additional 2nd-harmonic component. As a result of this additional component, the magnitude of the 2nd-harmonic signal component can no longer be used for write-intensity control.

SUMMARY OF THE INVENTION

It is an object of the present invention to provide a recording device of the described type present, in which the write intensity can also be optimized in the case of recording areas of varying width. In accordance with the invention, this object is achieved by means of a recording device including an improved analysis circuit. This analysis circuit generates an analysis signal in the form of a signal which indicates whether the d.c. component of the read signal has a specific position relative to the minimum and the maximum values of the read signal, which position is defined by the duty cycle. The invention is based inter alia on the recognition of the fact that the position of the d.c. component relative to the positive and negative peak values in the read signal is indicative of the ratio between the lengths of the recording areas and the intermediate areas. Moreover, it is found that the position of the A.C. component is hardly susceptible to width variations of the recording areas.

An illustrative embodiment of the recording device, which is very attractive because of its simplicity, is characterized in that the analysis circuit comprises a high-pass filter for eliminating the d.c. component in the read signal, a first peak detector for determining the maximum signal value in the read signal filtered by the high-pass filter, a second peak detector for determining the minimum signal value in the filtered read signal, a circuit for generating an analysis signal in the form of a signal which indicates whether the sum of the detected minimum and maximum values corresponds to an optimum value defined by the duty cycle. This arrangement advantageously utilizes the fact that after elimination of the d.c. component the sum of the negative and the position peak value indicates the position of the d.c. component relative to these peak values.

Another illustrative embodiment of the recording device is characterized in that the analysis circuit is adapted to supply an analysis signal in the form of a signal which indicates whether the ratio between the sum of the detected minimum and maximum values and the difference between the detected minimum and maximum values substantially corresponds to an optimum value defined by the duty cycle. This embodiment has the advantage that the influence of variations in average reflectivity of the record carrier and the influence of variations in the intensity of the read beam are eliminated. This is important in particular if the optimum write intensity corresponds to a non-zero value of the ratio between the sum and the difference of the peak values. This is the case, for example, when recording standard EFM signals for which the optimum ratio between the sum and the difference of the peak value is found to be substantially equal to 0.1.

Another embodiment of the recording device is characterized in that the device is adapted to form information patterns comprising first subpatterns and second subpatterns. The spatial frequency of the second subpatterns is lower than that of the first subpatterns, and the number of first subpatterns is larger than the number of second subpatterns. The dimensions of the subpatterns are selected in such a way that during reading of information patterns the amplitude of the signal components corresponding to the first subpatterns is smaller than the amplitude of the signal components corresponding to the second subpatterns. This embodiment has the advantage that small departures from the optimum write intensity procedure comparatively large deviations in the position of the d.c. component. Since in standard EFM signal recording the number of subpatterns of low spatial frequency is substantially smaller than the number of subpatterns of comparatively high spatial frequency, the optimum write intensity can be determined very accurately when a standard EFM signal is recorded. During recording of the information pattern, the write intensity can be adjusted, for example, by generating an additional read beam which trails the write beam at a short distance. However, a drawback of this method is that is requires comparatively intricate technical provisions.

An embodiment which does not require the use of an additional read beam is characterized in that the device comprises a circuit for generating a bivalent test signal and control circuit for causing test-information patterns corresponding to the test signal to be recorded at addressable locations on the record carrier. The control circuit is adapted to cause test-information patterns to be read by the optical read head, and the circuit for setting the write intensity is adapted to set the optimum write intensity in response to the analysis signals obtained during reading of the test-information patterns. This embodiment advantageously utilizes the fact that the optimum write intensity can be determined in a separate adjustment process prior to the actual information-recording process, enabling the optical scanner employed for recording the information pattern to be used, also, for determining the optimum write intensity. If a record carrier has preformed address information for addressing purposes, it is advantageous that the zone employed for recording information patterns for the purpose of determining the optimum write intensity be preceded by a zone which has not yet been used for determining the optimum write intensity. Indeed, the address information may be damaged while the information pattern is recorded, so that a correct read-out of the address information is no longer guaranteed. Locating a zone which closely follows a zone with damaged address information may then give rise to problems.

BRIEF DESCRIPTION OF THE DRAWING

Further embodiments and the advantages thereof will now be described in detail, by way of example, with reference to FIGS. 1 to 13.

FIG. 13 provides a schematic diagram for developing a logic signal for a recording device in accordance with FIG. 9.

DETAILED DESCRIPTION OF THE PREFERRED EMBODIMENT

Figure 1:
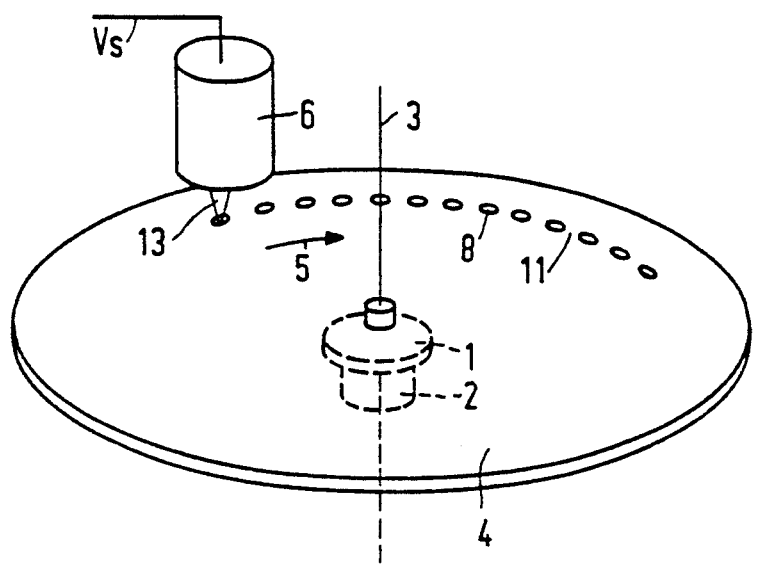
FIG. 1 illustrates diagrammatically a customary optical recording device.

FIG. 1 shows diagrammatically an optical recording device, comprising a turntable 1 and a drive motor 2 for rotating a disc-shaped record carrier 4 about an axis 3 in a direction indicated by an arrow 5. The record carrier 4 comprises a radiation-sensitive recording layer which upon exposure to radiation of sufficiently high intensity is subjected to an optically detectable change, such as, for example, a change in reflectivity. Such a radiation-sensitive layer may comprise, for example, a thin metal layer which can be removed locally by exposure to a laser beam of comparatively high intensity. Alternatively, the recording layer may consist of another material, such as, a radiation-sensitive dye or a phase-change material, whose structure can be changed from amorphous to crystalline or vice versa under the influence of radiation. An optical write head 6 is arranged opposite the rotating record carrier. The optical write head 6 comprises a radiation source, for example, a solid-state laser, for generating a write beam 13.

The intensity I of the write beam 13 can be modulated in conformity with a control signal Vs in a customary manner. The control signal Vs and the corresponding variation I of the write beam 13 are given in FIG. 2. The intensity I of the write beam 13 is switched between a high write intensity Is, which is adequate to bring about detachable changes in the optical properties of the radiation-sensitive record carrier, and a low write intensity Il, which does not bring about any detectable changes. When the recording layer is scanned with the beam 13, whose intensity is thus modulated, an information pattern of recording areas 8 having modified optical properties is formed in the recording layer, which recording areas alternate with intermediate areas 11 having unmodified optical properties. An information pattern thus formed can be read by scanning the pattern with a read beam of a constant intensity which is low enough to preclude a detectable change in optical properties.

Figure 2:
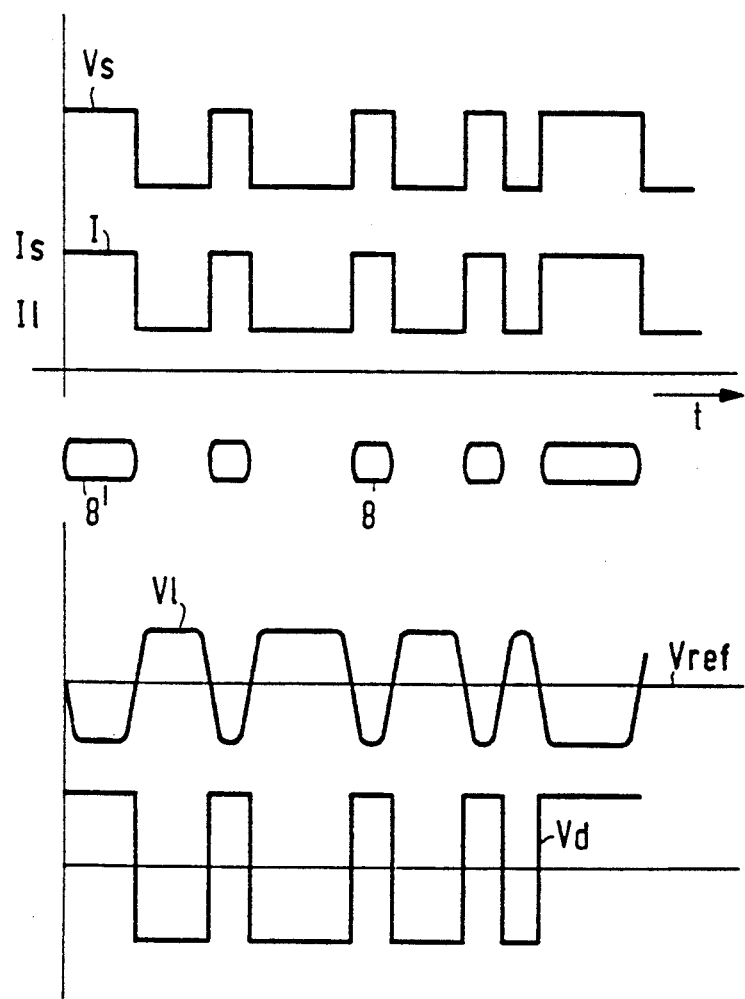
FIG. 2 shows the variation of the intensity of a radiation beam during optical recording, the associated information pattern, and the read signal V1 produced when this information pattern is read.

During scanning the read beam reflected from the record carrier is modulated in conformity with the information pattern being scanned. The modulation of the read beam can be detected in a customary manner by means of a radiation-sensitive detector which generates a read signal V1 which is indicative of the beam modulation. The read signal V1 is also shown in FIG. 2. The read signal V1 is reconverted into a bivalent signal Vd by comparison of the read signal with a reference level Vref.

For a reliable conversion, it is desirable that the points where the read signal V1 intersect the reference level as well-defined, in other words, the "jitter" in the read signal V1 should be minimal. As is known, jitter of the read signal in optical recording is minimal if the information pattern is symmetrical, i.e. if the average length of the recording areas 8 is equal to the average length of the intermediate areas 11.

Figure 3C:
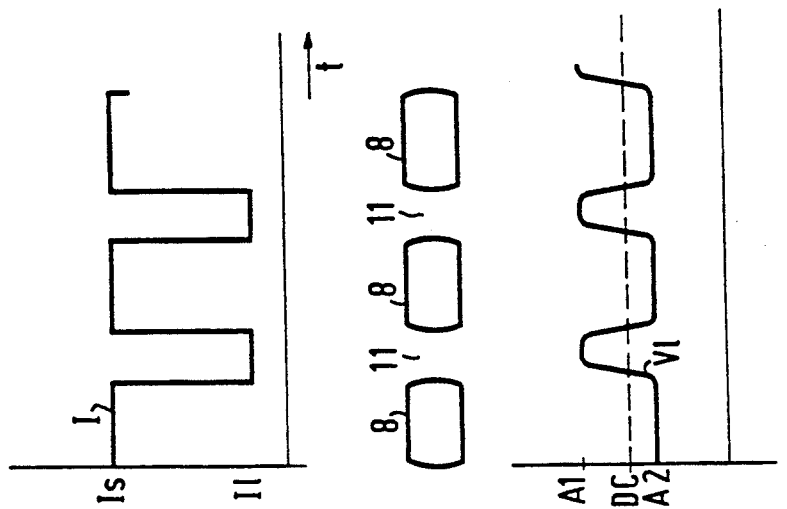
FIGS. 3a-c and 4a-c illustrate the relationship between recorded information patterns and the associated read signals while serving to clarity the present invention.
Figure 3B:
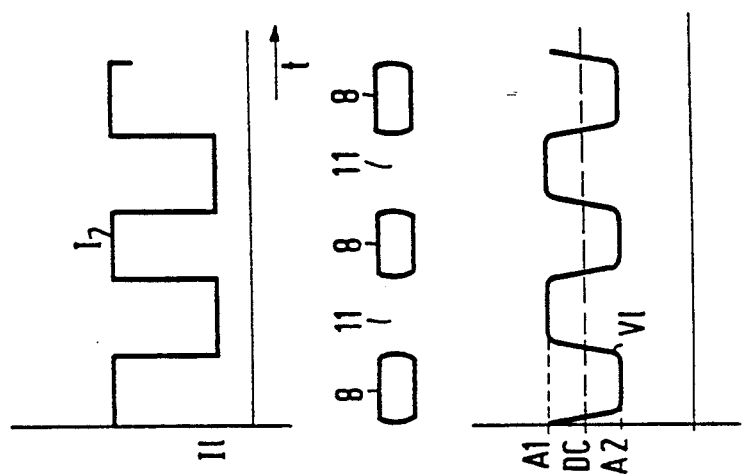
Figure 3A:
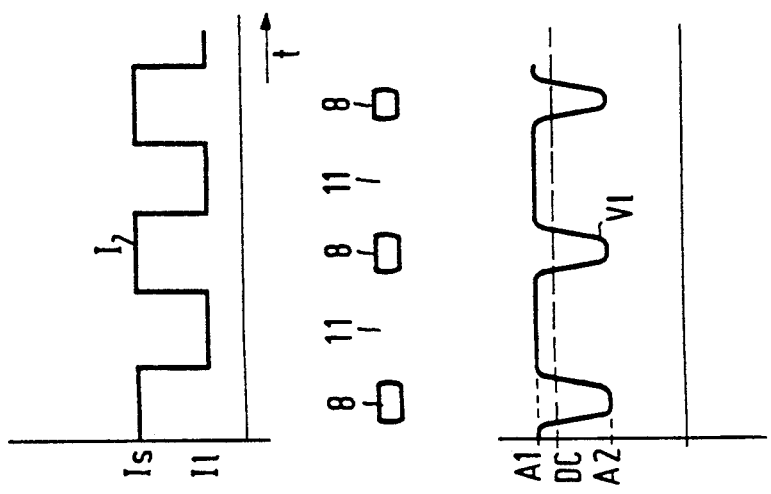

A problem which then arises is that the length of the recording areas 8 depends strongly on the write intensity Is. If the write intensity is too high, the recording areas will become too long, and if the write intensity if too low, the recording areas will become too short. Therefore, an accurate adjustment of the write intensity is required. In a conventional method of determining the optimum write intensity, which can be employed for recording write signals having an average duty cycle of 50%, the write intensity is adjusted so as to minimize the 2nd-harmonic distortion in the read signal V1. However, this method cannot be used in the case of recordings where as a result of, for example, thermal effects, the width of the recording areas is not constant, but the width of the recording zone, for example, increases from the beginning towards the end of the recording zone. The varying width introduces additional distortion into the read signal V1. This additional distortion results in an additional 2-nd-harmonic component, which renders the adjustment of the write intensity Is unreliable. A method of determining the optimum write intensity which is less susceptible to width variations will be explained with reference to FIG. 3. FIGS. 3a, 3b and 3c give the intensity variation I, the corresponding information pattern of recording areas 8 and intermediate areas 11, and the read signal V1 in the case that the write intensity Is is too low, optimum, and too high, respectively.

In FIG. 3 the read signals V1 vary between a maximum level A1 and the minimum level A2. The level DC represents the value of the d.c. level in the read signal V1. As will be apparent from FIG. 3, the d.c. level DC of the read signal V1 is situated substantially in the middle between the levels A1 and A2 in the case that the write intensity has the optimum value. If the write intensity is too low, the d.c. level DC will be situated above the middle between the levels A1 and A2, while in the case that the write level is too high, the d.c. level DC will be situated below the middle between the levels A1 and A2. Thus, an optimum write intensity can be obtained by adjusting the write intensity Is to a value for which the d.c. level DC is situated substantially in the middle between the levels A1 and A2.

Figure 4A:
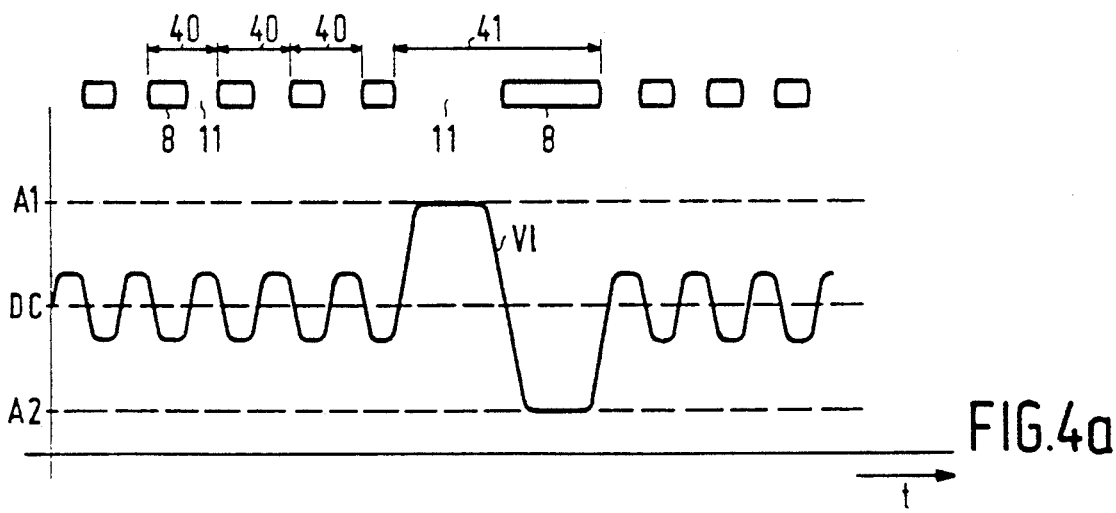

An improvement of the above method of determining the optimum intensity will be described with reference to FIG. 4a. In accordance with this method, an information pattern is recorded for the purpose of determining the optimum intensity. That pattern comprises a plurality of subpatterns 40 each comprising a short recording area 8 and a short intermediate area 11 recorded by means of a write signal having a 50% duty cycle. The information pattern further comprises a second subpattern 41 comprising a comparatively long recording area 8 and a comparatively long intermediate area 11 also recorded with the aid of a write signal having a 50% duty cycle. The number of subpatterns 40 is selected to be substantially larger than the number of subpatterns 41. FIG. 4a shows the read signal V1 obtained in the case of reading with the aid of an optical read device.

The dimensions of the subpatterns 40 are selected in such a way that the amplitude of the signal components in the read signal V1 corresponding to said subpatterns 40 is substantially smaller than the amplitude of the signal components corresponding to the subpatterns 41. This can be achieved by selecting the dimensions of the subpatterns 40 in such a way that only the 1st harmonic of this pattern is situated below the optical cut-off frequency of the optical scanning device. The dimensions of the subpatterns 41 are selected in such a way that at least the 1st and the 2nd harmonic of this pattern are situated below said optical cut-off frequency. The d.c. level DC in the read signal V1 is dictated mainly by the signal components corresponding to the subpatterns 40. The difference between the maximum value A1 and the minimum value A2 of the read signal V1 is dictated exclusively by the value corresponding to the subpattern 41. A change in write power Is has a substantially larger influence on the ration between the length of the recording areas 8 and the intermediate areas 11 of the subpatterns 40 than on the ratio between said lengths for the subpatterns 41. Consequently, the d.c. level DC will also be far more susceptible to write-level variations in the case of the method illustrated in FIG. 4 than in the case of the method illustrated in FIG. 3, where the amplitude of the read signal V1 is the same for all the subpatterns occurring in the information pattern. All of this means that the optimum write power can be determined far more accurately by means of the method illustrated in FIG. 4a.

Figure 4B:
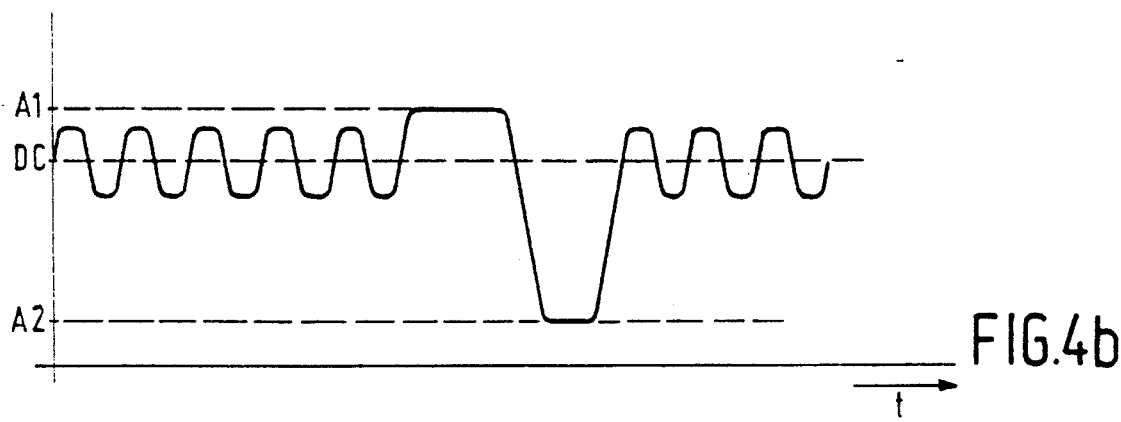
Figure 4C:
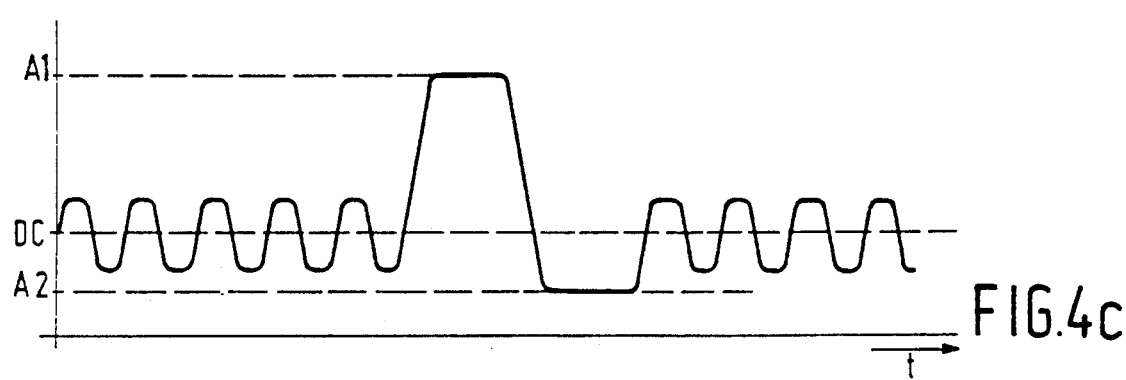

In addition to the information pattern shown in FIG. 4a, which has been recorded with an optimum write intensity, similar information patterns are shown in FIGS. 4b and 4c, which have been recorded with a write level which is too low and which is too high respectively. As will be apparent from FIG. 4, the d.c. level DC in the case of the optimum write intensity is again situated substantially in the middle between the maximum signal value (A1) and the minimum signal value (A2) in the signal V1, while in the case of a write level which is too low or too high the d.c. level DC is situated respectively above and below said middle. The information pattern shown in FIG. 4 is only one of the possible information patterns comprising a comparatively large number of subpatterns consisting of short areas (8 and 11) and a comparatively small number of subpatterns consisting of long areas (8 and 11). A subpattern which is also very suitable is a pattern corresponding to a standard EFM signal. Such a pattern comprises areas of length corresponding to at least 3 bits (I3-effect) and at the most 11 bits (I11 effect). Approximately one third of all the effects in such an EFM pattern are I3 effects, whereas only 4% of all the effects are I11 effects. The dimensions of the I3 effects are such that only the fundamental of these effects is situated below the optical cut-off frequency of the optical read system. Of the I11 effects, at least the 1st, the 2nd and the 3rd harmonics are situated below the optical cut-off frequency.

Figure 5:
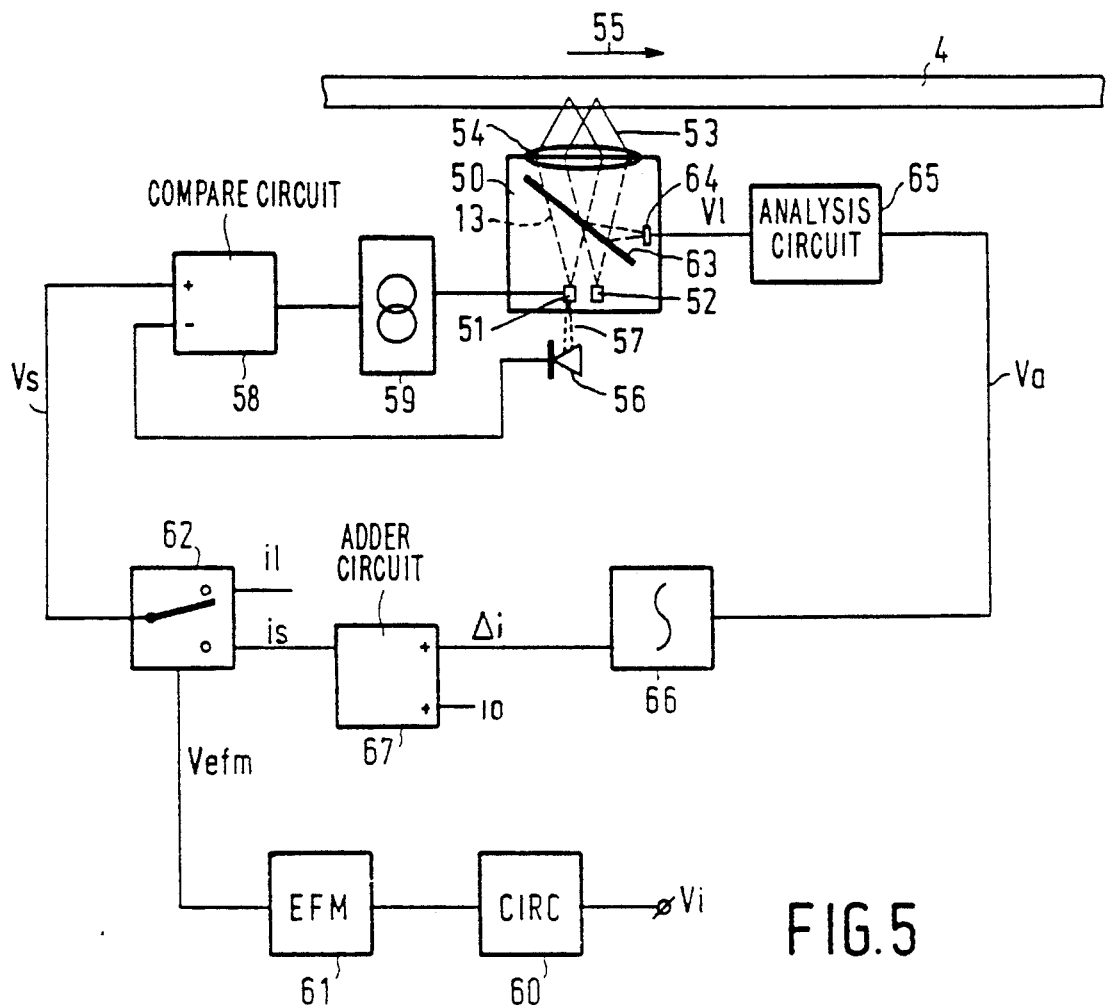
FIGS. 5 and 9 show two illustrative embodiments of the recording device in accordance with the invention.

FIG. 5 shows a first illustrative embodiment of the recording device in accordance with the invention. The recording device comprises an optical head 50 comprising a first semiconductor laser 51 for generating a write beam 13 and a second semiconductor laser 52 for generating a read beam 53. The write beam 13 and the read beam 53 are directed to the record carrier 4 by means of an optical system comprising an objective 54. The record carrier is moved past the optical head 50 in the direction indicated by an arrow 55. This is effected in a customary manner in such a way that, viewed in the direction of the arrow 55, the read beam 53 is incident on the record carrier 4 at a short distance after the landing spot of the write beam 13, so that the landing spot of the read beam 53 follows the path described by the landing spot of the write beam 13. For a more detailed description of optical systems by means of which both a write beam and a separate read beam can be produced simultaneously reference is made to U.S. Pat. Nos. 4,255,873 and 4,488,277.

The intensity I of the write beam 13 is controlled to assume a value dictated by the write signal Vs. For this purpose the recording device comprises a radiation-sensitive diode 56, which is arranged to detect the beam 57 which issues from the back of the semiconductor laser 51 and which has an intensity proportional to that of the write beam. The radiation-sensitive diode 56 then produces a signal current proportional to the detected intensity. The write signal Vs and the signal current are compared with each other in a comparator circuit 58. A signal which is indicative of the result of the comparison is applied to a controllable current source 59, which generates a control current for the semiconductor laser 51 in such a way that the signal current produced by the diode 56, and hence the intensity of the write beam 13, is controlled to assume the value dictated by the write signal Vs.

The recording device further comprises a cascade arrangement of a conventional CIRC encoding circuit 60 and an EFM modulator 61 for converting an applied information signal Vi into an EFM signal Vefm modulated in conformity with the CD standard. The signal Vefm is applied to a control input of a controllable switch 62 of a type which, depending on the logic value of the signal applied to its control input transfers one of the two inputs, signals is or il to its output. The signal on the output of the switch 62 is applied to the comparator circuit 58 as the write signal Vs. The signal is defines the write intensity Is and the signal il defines the intensity Il. An information pattern representing the signal Vi is recorded as follows.

The CIRC encoding circuit 60 and the EFM modulator 61 convert the signal Vi into an EFM modulated bivalent signal Vefm. This signal controls the switch 62 in such a way that the signal il and is are alternately applied to the comparator circuit 58, as a result of which, the intensity of the write beam is switched between the write intensity Is defined by this signal is and the intensity Il defined by the signal il, so that an information pattern corresponding to the signal Vefm is recorded on the record carrier. Briefly, after this recording, the information pattern thus formed is scanned by the read beam 53. The read beam is reflected from the record carrier 4, the reflected beam being modulated in conformity with the information pattern being scanned. The read beam, thus modulated, is directed to a radiation-sensitive detector 64 via a semitransparent mirror 63, which detector generates a read signal V1 which is indicative of the beam modulation. The read signal V1 is applied to an analysis circuit 65, which generates a signal Va which indicates the extent to which the d.c. level DC deviates from the value corresponding to the optimum write intensity. The signal Va is applied to an integrating circuit 66. The output signal $\Delta i$ of the integrating circuit is applied to an input of an adder circuit 67. A signal io corresponding to a reference intensity level is applied to the other input of the adder circuit 67. An output signal which is indicative of the sum of the signal io and the signal $\Delta i$ is applied to the switch 62 as the signal is. If in the recording device shown in FIG. 5 the write intensity Is deviates from the optimum value, this will be indicated by the analysis signal Va in that it has a non-zero signal value. As a result of this, the signal $\Delta i$ on the output of the integrating circuit 66 will change, so that the write intensity Is is controlled towards the optimum value. This results in continuous control of the write intensity Is, so as to maintain the write intensity Is substantially at the optimum value.

Figure 6:
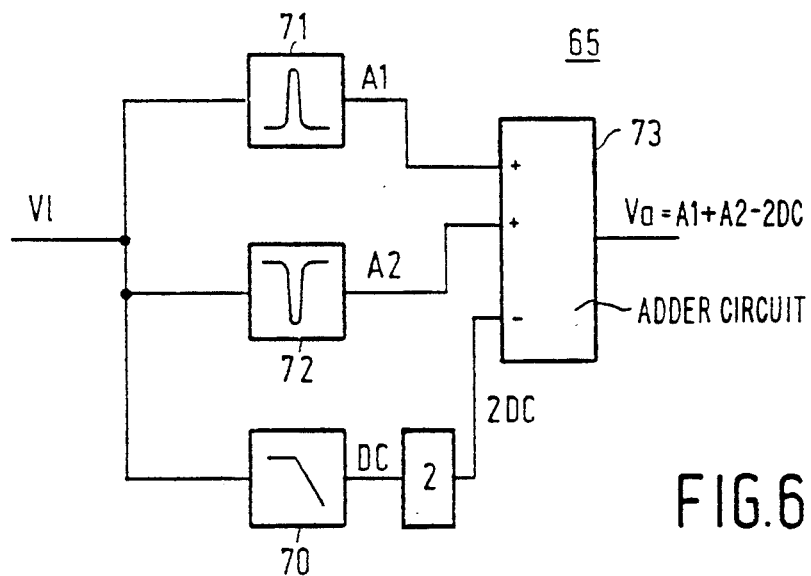
FIGS. 6, 7, 8 and 13 depict various embodiments of an analysis circuit for use in the recording device of FIGS. 5 and 9.

FIG. 6 shows a first illustrative embodiment of the analysis circuit 65, comprising a low-pass filter 70 for determining the d.c. level DC in the read signal V1; a positive-peak detector 71 for determining the maximum value A1 in the read signal V1; and the negative-peak detector 72 for determining the minimum value A2 in the read signal V1. The output signals of the peak detectors 71 and 72 are applied to non-inverting inputs of an adder circuit 73, while the output signal of the low-pass filter 70, after being amplified to twice its value, is applied to an inverting input of the adder circuit 73, os that the output signal of the adder circuit 73, which signal constitutes the analysis signal Va, is equal to $Va = A1 + A2 - 2DC$ and consequently indicates the extent to which the position of the signal value DC deviates from the middle between the maximum signal value A1 and the minimum signal value A2.

Figure 7:
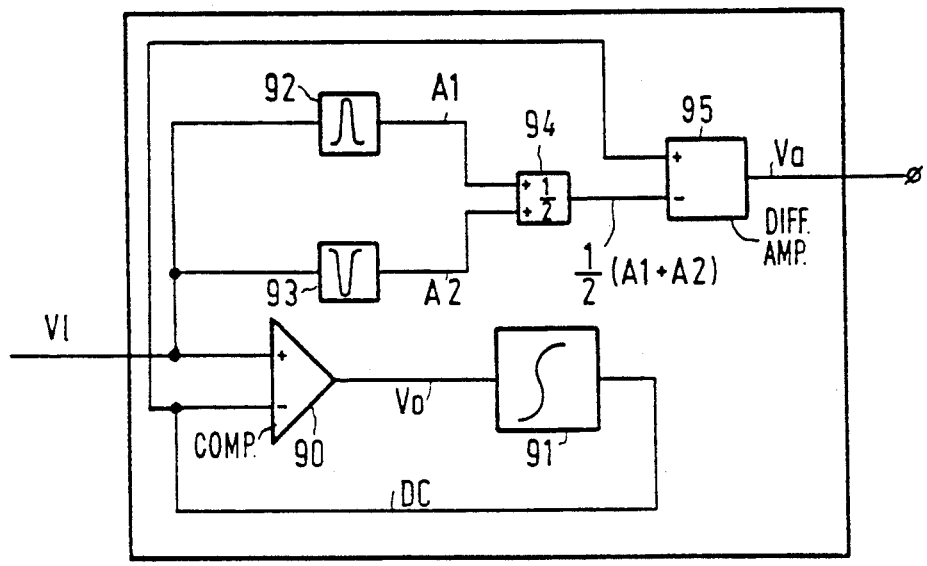

FIG. 7 shows yet another illustrative embodiment of the analysis circuit 65. This embodiment comprises a comparator 90 to which the read signal V1 and the reference signal representing the value DC are applied to the non-inverting input, and the inverting input respectively. The output signal of the comparator 90 is applied to an integrating circuit 91. The read signal V1 is further applied to a positive peak detector 92 and a negative-peak detector 93, which detect the maximum and the minimum signal level in the read signal V1, respectively, and which apply signal which are indicative of the signal levels to an adder circuit 94 having a gain factor of $\frac{1}{2}$, so that the signal level on the output of the adder circuit 64 is situated halfway between the minimum and the maximum signal level of the corrected read signal V1. The signal on the output of the adder circuit 94 is applied to the inverting input of a differential amplifier 95 and the reference signal, which is representative of the value DC, is applied from the integrating circuit 91 to the non-inverting input of the differential amplifier 95. An output signal of the differential amplifier 95, which signal is indicative of the difference between the two input signals of the differential amplifier, functions as the analysis signal Va. The analysis circuit shown in FIG. 7 operates as follows. As a result of the feedback from the integrating circuit 91 to the inverting input of the comparator 90, the reference signal on the output of the integrating circuit will be adjusted to a level for which the output signal Vo of the comparator 30 averages zero, so that the signal value on the output of the integrator 91 indicates the level of the d.c. component in the read signal V1. The analysis signal Va again indicates the extent to which the position of the d.c. level deviates from the middle between the minimum and the maximum level of the read signal.

Figure 8:
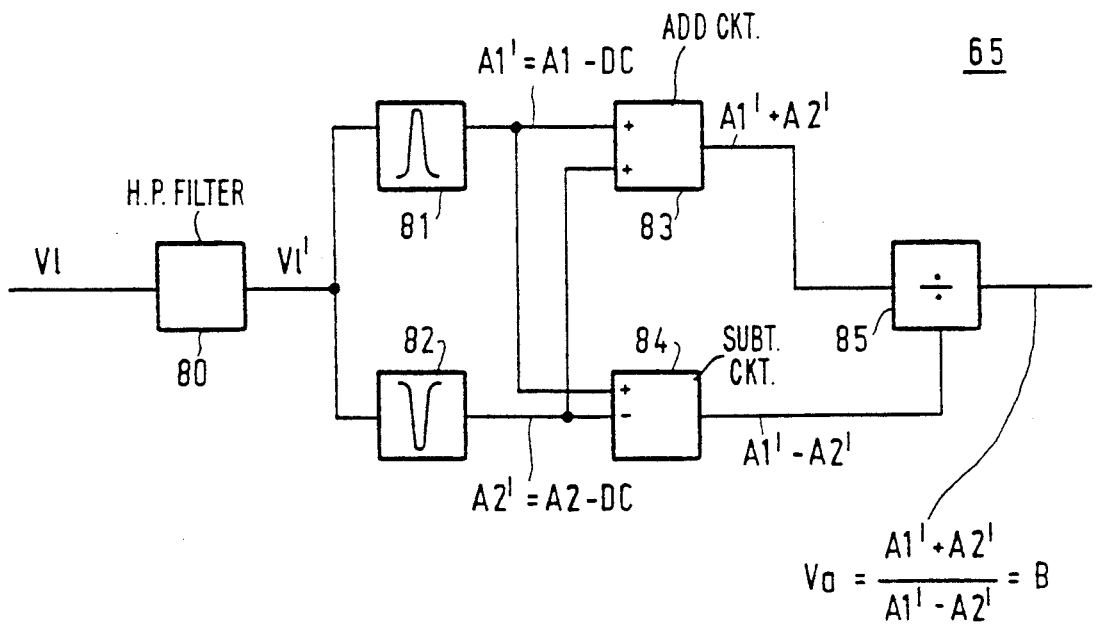

FIG. 8 shows a third illustrative embodiment of the analysis circuit 65. This embodiment comprises a high-pass filter 80 for eliminating the d.c. component from the read signal V1. The signal V1', from which the d.c. component has, thus, been removed, is applied to a positive-peak detector 81 and to a negative-peak detector 82. The signal value A1' on the output of the positive-peak detector 81 is equal to the signal value A1 minus the value d.c. The signal value A2' on the output of the negative peak detector 82 is equal to the signal value A2 minus the value DC. By means of an adder circuit 83, the sum of A1' and A2' is determined, and by means of a subtractor circuit 84, the difference between A1' and A2' is determined. A dividing circuit 85 determines the quotient of the signal values on the outputs of the adder circuit 83 and the subtractor circuit 84. This quotient, hereinafter referred to as $\beta$, also indicates the extent to which the position of the d.c. level DC deviates from the middle between the signal values A1 and A2. The output signal of the dividing circuit, which indicates the value of $\beta$, again functions as the analysis signal Va. As a result of the division by the difference between A1' and A2', it is achieved that intensity variations in the radiation generated by the semiconductor laser 53, or variations in the average reflectivity of the record carrier, no longer have any influence on the signal value of the analysis signal Va. The advantage of this will be explained hereinafter.

Although satisfactory results are obtained when during recording of an EFM signal the write intensity Is is set to a value corresponding to a d.c. level DC situated exactly in the middle between the maximum and the minimum value of the read signal, this setting is found not to be exactly optimal. For symmetrical EFM information patterns, the value $\beta$ is not exactly zero but is approximately 0.1. This is a result of the fact that the d.c. influence of components in the read signal corresponding to patterns having a high spatial frequency is smaller than that of signal components corresponding to patterns having a low spatial frequency. To optimize the write intensity for recording EFM modulated signals, the write intensity Is is, therefore, suitably set to a value for which $\beta$ is substantially equal to 0.1. For this setting, for which $\beta$ has a non-zero value, elimination of the effect of intensity variations is very important because without this elimination an accurate adjustment is difficult to achieve.

In the embodiment of the recording device in accordance with the invention described above, the write intensity is corrected continuously. The drawback of this recording device is that for this purpose an additional read beam must be generated, which is a comparatively difficult technical problem. Another method which mitigates this drawback will now be described.

In this embodiment the optimum write intensity is determined in a separate set-up cycle prior to recording of the information signal Vi. During this set-up cycle, a test-information pattern is recorded with different write intensities Is in addressable zones on the record carrier. Subsequently, these test-information patterns are read by means of the analysis signal Va derived from the read signal, it is determined which test-information pattern has been recorded with the optimum write intensity, and the write intensity Is during recording of the information signal Vi is set to the write intensity corresponding to the test-information pattern thus found.

An embodiment of a recording device in which the intensity is determined in conformity with the method described above is shown in FIG. 9. The recording device shown therein comprises drive means in the form of a motor 100 and a turntable 101 for rotating a radiation-sensitive record carrier 4' about an axis 102. The record carrier is of a type on which address information has been recorded by means of a track modulation of a servo track. Such a record carrier 4' is described comprehensively in published Netherlands Patent Applications NL-A-8800151, NL-A-8900766 and NL-A-8901145, herewith incorporated by reference. The record carrier described in those Patent Applications has a "wobbling" servo track, the frequency of the wobble being modulated in conformity with a position-information signal comprising absolute time codes ATIP. An optical read/write head 105 of a customary type is arranged opposite the rotating record carrier 4' and can be moved in a radial direction relative to the record carrier 4' by means of a positioning device, for example, in the form of a motor 103 and a spindle 104. If desired, the read/write head 105 can be employed both for recording information patterns and for reading information patterns. For this purpose, the read/write head 105 comprises a semiconductor laser for generating a radiation beam 107a whose intensity is variable by means of a control circuit 107. In a known manner, the radiation beam 107 is aimed at the servo track of the record carrier 4'. The beam 107a is partly reflected from the record carrier 4', the reflected beam being modulated in conformity with the track wobble and, if an information pattern has been recorded, also in conformity with the information pattern. The reflected beam is directed towards a radiation sensitive detector 108a, which generates a read signal V1" corresponding to the beam modulation. The signal V1" comprises a component produced by the track wobble and having a frequency of approximately 22 kHz at the nominal scanning velocity. By means of a motor control circuit 108 for controlling the motor 100, the motor speed is controlled so as to maintain the frequency of the component produced in the read signal V1" by the track wobble at substantially 22 kHz. The read signal V1" is also applied to a detection circuit 109, which derives the time codes ATIP from the component produced in the read signal V1" produced by the track wobble and applies these codes to a processing unit comprising, for example, a microcomputer 110. Moreover, the read signal V" applied to an amplifier circuit 111 having a high-pass characteristic to reject the signal components produced in the read signal V1" by the track wobble. The read signal V1', from which the low-frequency components have thus been removed, is applied to the analysis circuit 65, for example the circuit shown in FIG. 8. The analysis signal Va on the output of the analysis circuit 65 is also applied to the microcomputer 110. The recording device further comprises a customary CIRC encoding circuit 112, to which the signal Vi to be recorded can be applied via a switch 115 which is controlled by the microcomputer 110. The CIRC encoding circuit 112 is arranged in series with the conventional EFM modulator 113. The EFM modulator has its output connected to the control circuit 107. The control circuit 107 is of a controllable type, which is coupled to the microcomputer 110 to receive control signals. Depending on the control signals received from the microcomputer 110 the control circuit 107 sets the intensity of the generated beam 107a to a constant low intensity Il, or the control circuit 107 switches the intensity of the beam between the low level Il and the write level Is in conformity with the EFM-modulated signal received from the EFM modulator 113. Moreover, the write level Is can be adjusted by the microcomputer 110.

Figure 10:
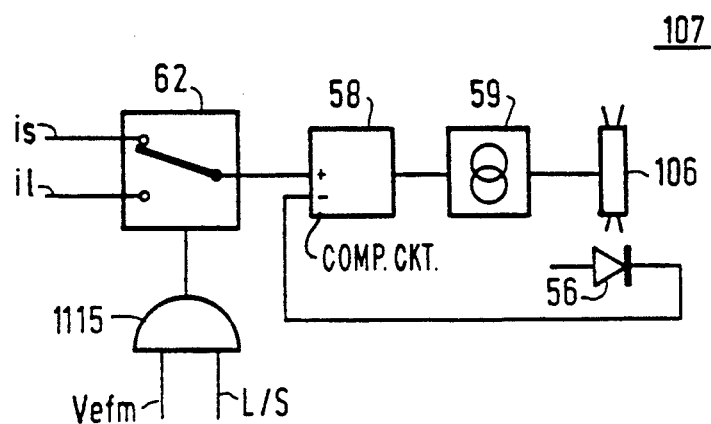
FIG. 10 shows an example of a control circuit for controlling the write intensity of the radiation beam.

FIG. 10 shows an embodiment of the circuit 107, which bears much resemblance to the circuit shown in FIG. 5 for controlling the intensity of the semiconductor laser 51. In FIG. 10, elements corresponding to those in FIG. 5 bear the same reference numerals. The circuit 107 comprises a two-input AND gate 1115, the EFM-modulated signal Vefm supplied by the EFM modulator 113 being applied to one of its inputs and a control signal L/S from the microcomputer 110 being applied to its other input. If the control signal L/S assumes the logic "0" value, the logic value on the output of the AND gate 1115 also becomes 0. The output signal of the AND gate 115 is applied to the control input of the switch 62, which is constructed in such a way that in the case of a control signal of the logic value "0" the signal Il corresponding to the low intensity level Il is applied to the circuit 58, so that the intensity of the beam 107a produced by the laser 106 is set to the value Il. In the case that the logic value of the control signal L/S is "1" the logic value on the output of the AND gate 1115 will vary in conformity with the signal EFM, so that the intensity of the beam 107a is then alternately set to the write intensity Is and the intensity Il in conformity with the signal Vefm.

Figure 9:
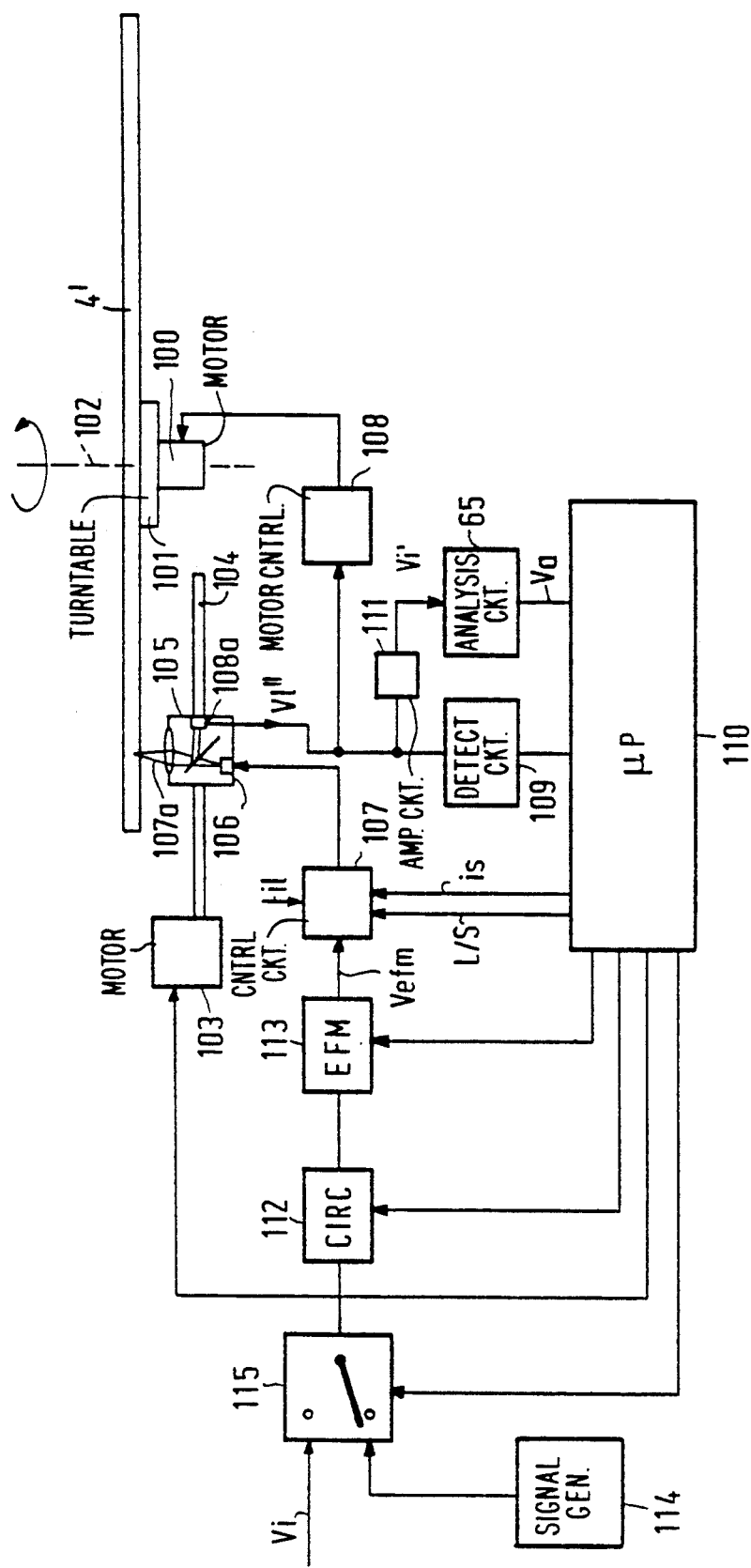

For the purpose of generating a test-information pattern, the recording device shown in FIG. 9 comprises a signal generator 114, which generates, for example, an arbitrary digital signal or which generates a signal corresponding to the digital signal value zero (digital silence). The signal generated by the signal generator 114 is applied to the CIRC encoding circuit 112 via the switch 115. The switch 115 is of a customary type which, depending on the control signal received from the microcomputer 110, transfers either the signal Vi to be recorded or the output signal of the signal generator 114.

Figure 11:
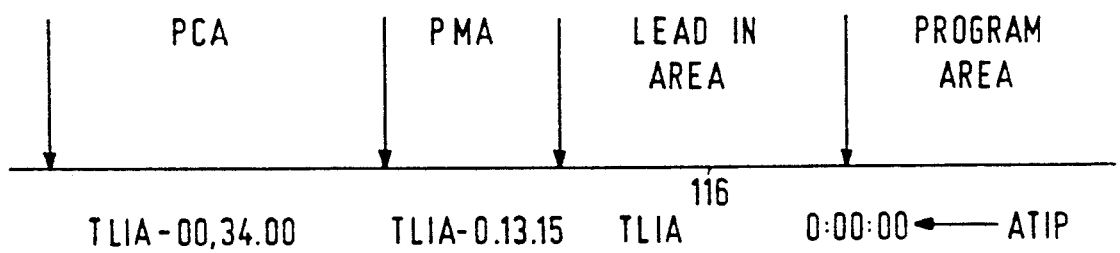
FIG. 11 presents a possible lay-out of an inscribable record carried provided with address information.

As stated above, the test-information patterns are preferably recorded at addressable locations on the record carrier 4'. If the record carrier 4' is configured in conformity with the aforementioned Netherlands Patent Application NL-A-8900766, in which the servo track is divided, in this order, into an area (PMA) for recording a temporary table of contents (Temporary TOC), an area (Lead In Area) for the storage of the definitive table of contents (TOC), and a program area (PA), the test-information patterns are preferably recorded in an area (PCA) which precedes the area (PMA) for recording the temporary table of contents. By way of illustration, FIG. 11 shows a layout of the servo track 116. Moreover, FIG. 11 shows start positions for the various areas indicated by means of absolute time codes ATIP expressed in minutes, second and frames. For example, the absolute time code ATIP for the beginning of the program area is 0.00.00. The absolute time code ATIP at the beginning of the lead-in area is marked by TLIA. The absolute time code ATIP at the beginning of the area PMA is equal to TLIA minus 0.13.15, while the beginning of the area PCA has an absolute time code equal to TLIA minus 0.34.00. Every absolute time code ATIP marks a servo-track portion having a length corresponding to one frame. Thus, in the area PCA, 1560 frames are available for recording the test patterns. Since an area corresponding to 15 frames is long enough to determine the optimum write intensity, the total length of the area PCA is amply sufficient to carry out the set-out cycle one hundred times. If the record carrier is used for recording standard CD signals, this number is amply sufficient to carry out one set-up cycle for every information signal to be recorded. This is because, in accordance with the CD-standard, the maximum number of different information signals (tracks) is one hundred. Preferably, for each of the possible one hundred different information signals (tracks), a predetermined section having a length of 15 frames (briefly referred to as the 15-frame area) is reserved in the PCA area.

Since the read-out of the ATIP codes in the areas in which a test-information pattern has already been recorded is not always guaranteed, the sequence in which the "15-frame" areas are used is suitably from back to front, i.e. the first "15frame" area to be used is situated at the end (i.e. near the boundary with the PMA area) of the PCA area. For recording a subsequent information signal (track) having a sequence number n in the temporary table of contents, a "15-frame" area is used which is situated n "15-frame" areas before the end of the PCA area. In this way, it is achieved that an area used for determining the optical write intensity for a given information signal is always preceded by a comparatively large area in which no test-information pattern has been recorded yet. This is an advantage because in a servotrack portion in which in information pattern has already been recorded the absolute time code ATIP cannot always be read reliably, although this is necessary for determining the beginning of the "15-frame" area to be used.

The optimum write intensity can be determined as follows: Before a new information signal (track) is recorded, the number of information signals (tracks) already recorded is determined by means of the data in the temporary table of contents in the PMA area. The address of the "15-frame" area for recording the test-information pattern is derived from said number. Subsequently, a test-information pattern, preferably a test pattern as shown in FIG. 4 or a similar test pattern, for example, a pattern corresponding to an EFM signal, is recorded with a number of different write-intensity settings in the "15-frame" area having the specified address. After this, the recorded test-information pattern is read and by means of the analysis signal Va it is determined in which part of the area the test-information pattern is optimum. Subsequently, the information signal is recorded with a write intensity corresponding to the write intensity with which the optimum test-information pattern has been recorded.

Figure 12:
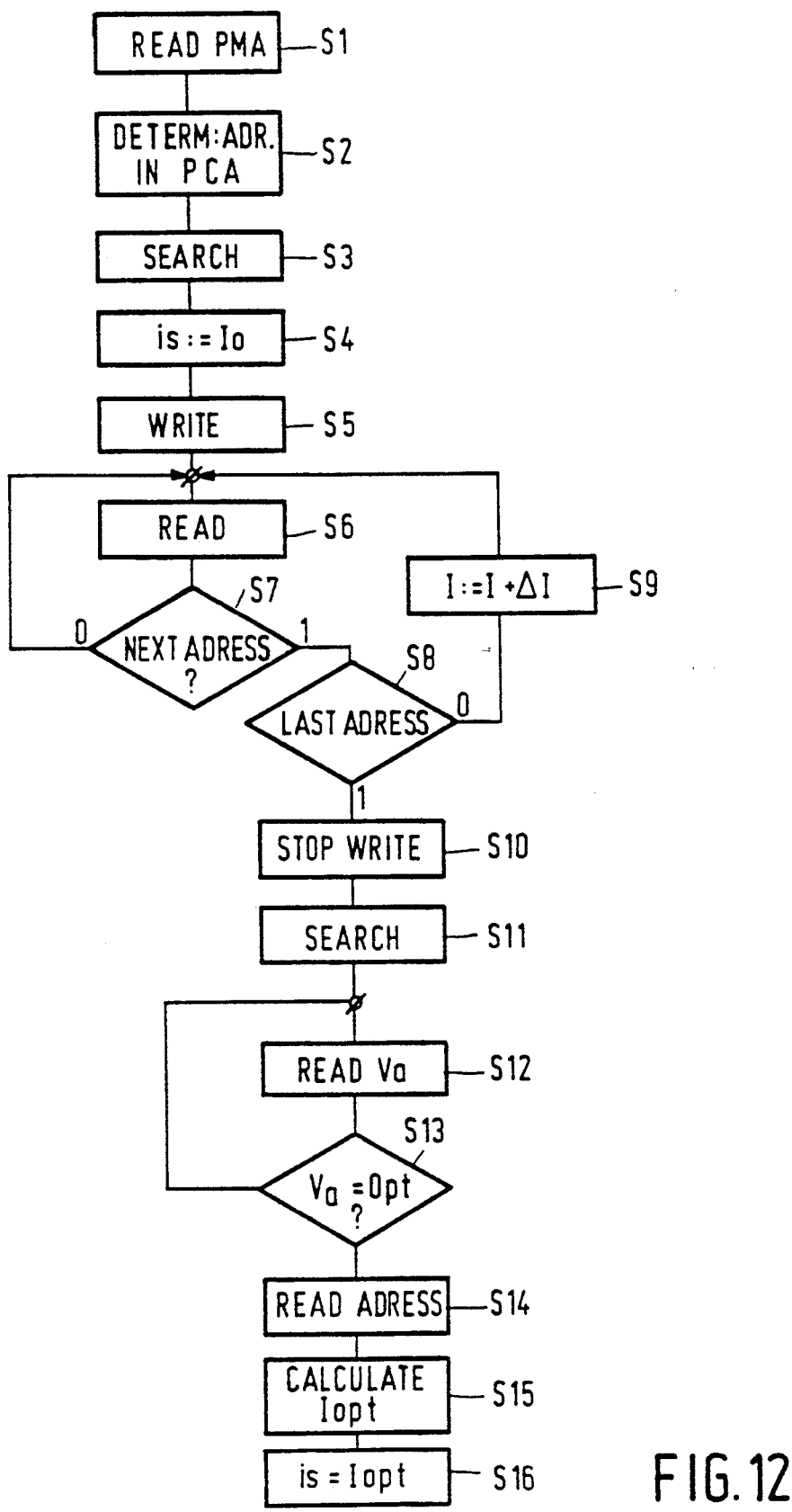
FIG. 12 is a flow chart of a computer program for controlling the recording device shown in FIG. 9.

The microcomputer 110 is loaded with a suitable control program for carrying out the set-up cycle. FIG. 12 is a flow chart of an example of such a program. In step S1 of this program, the read/write head 105 is positioned opposite the PMA area on the record carrier under control of the microcomputer 110, addressing being effected by means of the absolute time codes ATIP in the read signal V1" detected by the detection circuit 109. In step S2, the temporary table of contents is read from the PMA area and the address of the "15-frame" area to be used for recording the test-information pattern is derived from the information about the number of previously recorded information signals in the temporary table of contents. In step S3, the 15-frame area having the appropriate address is located under control of the microcomputer 110. Once this area is reached, the write intensity Is is set to an initial value Io in step S4. Preferably, the value of Io for the relevant record carrier is prerecorded on the record carrier in a manner as described in the aforementioned Patent Application NL-A-8901145. This value can then be read prior to the set-up cycle. Moreover, under control of the microcomputer 110, the signal generator 114 is connected to the CIRC encoding circuit 112 by means of the controllable switch 115, so that an EFM modulated test signal determined by the output signal of the signal generator is generated by the EFM modulator 113. Finally, in step S5, the control signal S/L sets the control circuit 107 in such a way that the intensity of the beam 107a is switched between the set value of the write intensity Is and the write intensity Il in conformity with the EFM modulated signal Vefm on the output of the EFM modulator 113, which results in a test-information pattern corresponding to an EFM signal being recorded. In step S6, the absolute time code ATIP detected by the detection circuit 109 is read out by the computer 110. In step S7, a determination is made as to whether this absolute time code has changed relative to the previous read-out. If this is not the case, step S6 is repeated. If it has changed, a determination is made in step S8 as to whether the absolute time code being read indicates the end of the 15-frame area. If this is not the case, step S9 is carried out, in which the write intensity Is is incremented by a small step ΔI, after which the program proceeds with step S6. If in step S8 it is found that the end of the 15-frame area has been reached, step S10 is performed in which the control signal S/L sets the control circuit 107 in such a way that the intensity of the beam 107 is maintained constant at the level Il. In step S11, the beginning of the 15-frame area is located and this area is read. In step S12, the analysis signal Va is read by the microcomputer 110. In step S13, a determination is made as to whether the value of the analysis signal Va corresponds to the optimum write intensity. If this is not the case, the program proceeds with step S12. In the other case, the absolute time code detected by the detection circuit 109 is read out in step S14. Subsequently, in step S15 the optimum write intensity corresponding to the absolute time code read in step S14 is computed. This is possible, for example, by determining the difference between the absolute time code last read and the time code corresponding to the beginning of the 15-frame area. By means of this difference, it is possible to determine by how many steps ΔI the initial value Io has been incremented before the absolute time codes ATIP last read was reached during recording of the test-information pattern. This number of steps and the initial value Io define the optimum write energy Iopt. Finally, in step S16, the write intensity Is is set to the optimum value Iopt.

Figure 13:
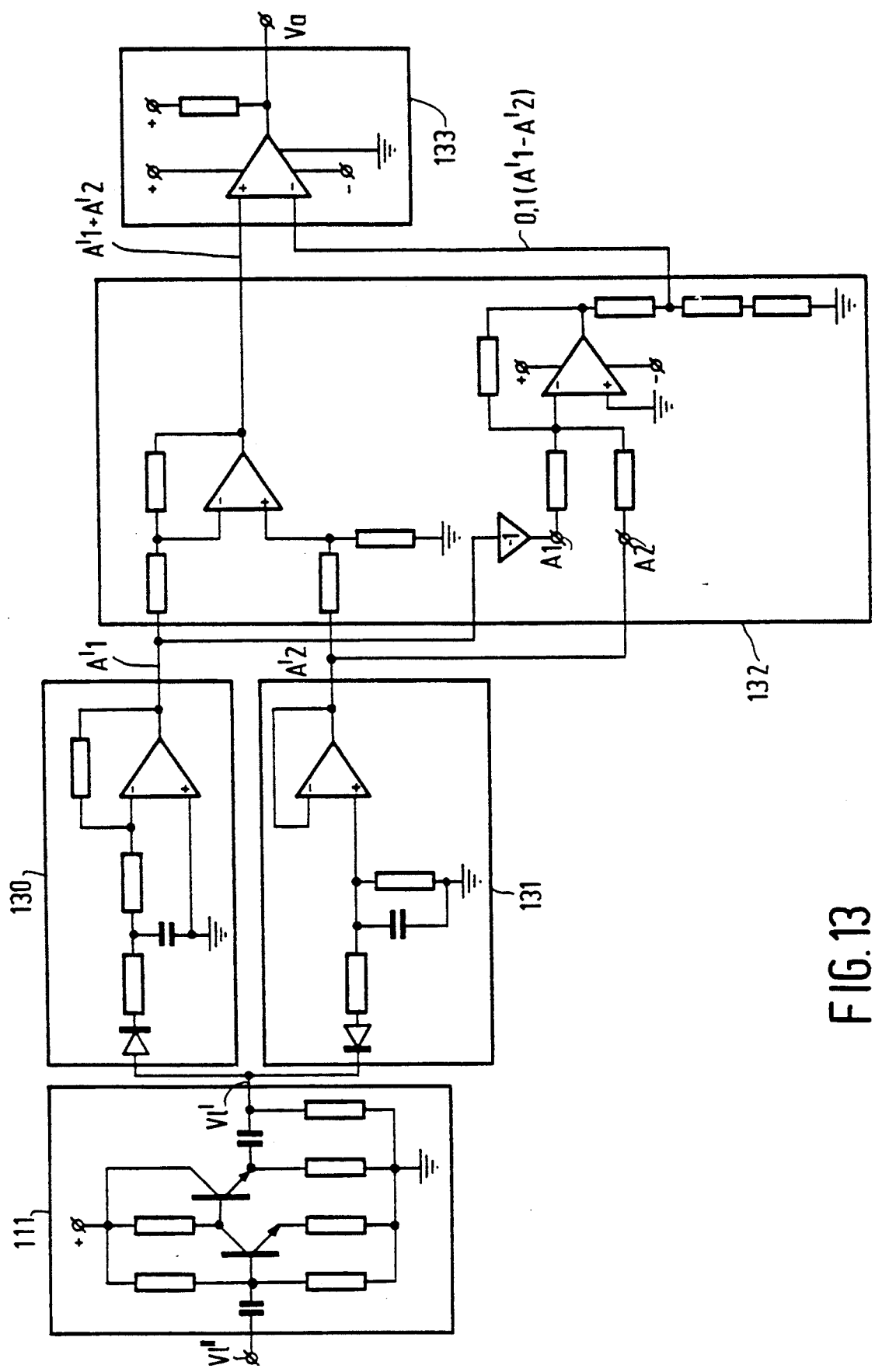

All the illustrative embodiments of the analysis circuit 65 described upt to the point supply an analysis signal Va which specifies both the magnitude and the sign of the deviation of the d.c. level DC in the read signal from the optimum level. However, this is not necessary for the illustrative embodiment of the recording device shown in FIG. 9. In that device, it is adequate to use an embodiment of the analysis circuit 65 in which a logic signal indicates whether the position of the d.c. level DC is situated within a specific small range around the optimum level. An embodiment which generates such a logic signal as the analysis signal Va is shown in FIG. 13. In this embodiment, the read signal V1', from which the d.c. component has been removed, by means of a high pass filter circuit 111, is applied to a positive-peak detector 130 and a negative-peak detector 131, which determine the maximum signal value (A1') and the minimum signal value (A2') in the read signal V1'. The output signals of the peak detectors 130 and 131 representing the maximum value A1' and the minimum value A2' are applied to a computing circuit 132, which in a customary manner generates two signals representing the value of the sum of A1' and A2' and the value of one tenth of the difference between A1' and A2', respectively. The two output signals for the computing circuit 132 are applied to a window comparator circuit 133, comprising, for example, an integrated circuit of the type LM311. The window comparator circuit 113 exclusively supplies a logic "1" signal if the absolute value of (A1'+A2')−0.1(A1'−A2') is smaller than or equal to Σ, Σ being a small value larger than zero. The value of Σ is selected, for example, in such a way that a logic "1" signal is generated if $$\beta = \frac{A1' + A2'}{A1' - A2'}$$

is between 0.09 and 0.11. Again the logic signal on the output of the comparator circuit 133 serves as the analysis signal Va.

This invention is not to be limited by the embodiments shown in the drawing and described in the description, which are given by way of example and not of limitation, but only in accordance with the scope of the appended claims.

We claim:

1. An optical recording apparatus for recording a digital information signal having successive signal portions on a radiation-sensitive record carrier, each signal portion having a duty cycle, the apparatus comprising:
    recording means for recording a signal portion on the record carrier by scanning the record carrier with a write beam, said recording means having switching means for switching the write beam between a low intensity level which is insufficient to bring about a change in optical properties of the record carrier at a scanning location and a high intensity level which is sufficient to produce a change in optical properties of the record carrier at a scanning location in conformity with the signal portion during recording thereof so as to produce a recorded information pattern of recording areas having first optical properties and intermediate areas having second optical properties, the average ratio of the lengths of the recording areas and intermediate areas being optimum when it corresponds to the duty cycle of the signal portion, such average ratio being controllable by variation of the high intensity level of the write beam;
    read means for scanning the recorded information pattern with a read beam to produce a corresponding read signal;
    an analysis circuit comprising:
        means for deriving from the read signal a first peak signal which corresponds to a maximum level of the read signal and a second peak signal which corresponds to a minimum level of the read signal; and
        means for combining the first and second peak signals so as to derive therefrom an analysis signal indicative of deviation of a DC component of the read signal from a specific value relative to the first and second peak signals, the specific value corresponding to the duty cycle of the signal portion; and
    means for setting at least the high intensity level of the write beam in dependence upon the analysis signal for recording a subsequent signal portion of the information signal, whereby the lengths of the recording areas and intermediate areas produced for the subsequent signal portion are brought substantially into conformity with the optimum average ratio thereof.

2. The apparatus as claimed in claim 1, wherein said analysis circuit further comprises means for deriving the DC component, and said means for combining is adapted to derive the analysis signal from a combination of the DC component and the sum of the first and second peak signals.

3. The apparatus as claimed in claim 2, wherein said means for deriving the DC component comprises a low pass filter.

4. The apparatus as claimed in claim 2, wherein said means for deriving the DC component comprises a comparator having a positive and a negative terminal and an output, and an integrator having an input and an output, the output of said comparator being connected to the input of said integrator, and wherein the read signal is applied to the positive terminal of said comparator and the output of said integrator is applied to its negative terminal.

5. The apparatus as claimed in claim 1, wherein said analysis circuit further comprises means for eliminating the DC component from the read signal prior to derivation of the first and second peak signals therefrom, and said means for combining is adapted to derive the analysis signal from a ratio of the sum to the difference of the first and second peak signals.

6. The apparatus as claimed in claim 5, wherein the information signal is a standard EFM signal and the ratio used in deriving the analysis signal is substantially equal to 0.1 when the average ratio is optimum.

7. The apparatus as claimed in claim 1, wherein the recorded information pattern produced from recording the signal portion comprises first and second subpatterns, the spatial frequency of the second subpatterns being lower than that of the first subpatterns, the number of first subpatterns exceeding the number of second subpatterns, and the dimensions of the subpatterns being such that upon read-out thereof by said read means the signal components of the read signal produced by the first subpatterns are of lesser amplitude than the signal components thereof produced by the second subpatterns.

8. The apparatus as claimed in claim 1, wherein the information signal comprises a bivalent test signal as its first signal portion; and the apparatus further comprises
signal generating means for producing the bivalent test signal; and
control means for causing the apparatus to record the bivalent test signal in the form of recorded a test-information pattern at at least one addressable location on the record carrier.

9. The apparatus as claimed in claim 8, wherein said control means is adapted to control the apparatus to record the bivalent test signal so that the recorded test-information pattern is produced in a section of a predetermined area (PCA) of the record carrier which is identified by previously recorded address information, such section following other sections of the area (PCA) in which test-information patterns have not yet been produced.

10. The apparatus as claimed in claim 8, wherein said means for setting at least the high intensity level of the write beam is adapted to set the high intensity level of the write beam in dependence upon the analysis signal derived from a read test signal produced by said read means scanning the test-information pattern for recording subsequent signal portions of the information signal.

11. An optical recording apparatus for recording a digital information signal having successive signal portions on a radiation-sensitive record carrier, each signal portion having a duty cycle, the apparatus comprising:
recording means for recording a signal portion on the record carrier by scanning the record carrier with a write beam, said recording means having switching means for switching the write beam between a low intensity level which is insufficient to bring about a change in optical properties of the record carrier at a scanning location and a high intensity level which is sufficient to produce a change in optical properties of the record carrier at a scanning location in conformity with the signal portion during recording thereof so as to produce a recorded information pattern of recording areas and intermediate areas which are distinguishable from each other, the average ratio of the lengths of the recording areas and intermediate areas in the scanning direction constituting a duty cycle of the recorded information pattern, which duty cycle is controllable by adjustment of the high intensity level of the write beam;
read means for scanning the recorded information pattern with a read beam to produce a corresponding read signal;
an analysis circuit comprising:
means for deriving from the read signal a first peak signal having a value indicative of a maximum level of the read signal and a second signal having a value indicative of a minimum level of the read signal; and
means for combining the first and second signals so as to derive therefrom an analysis signal indicative of deviation of a DC component of the read signal from a desired level in relation to the values of the first and second signals, such derivation being indicative of deviation of the duty cycle of the recorded information pattern from an optimum value thereof; and
means for setting at least the high intensity level of the write beam in dependence upon the analysis signal for recording a subsequent signal portion of the information signal, whereby the duty cycle of the recorded information pattern produced for the subsequent signal portion will substantially conform with the optimum value thereof.

12. The apparatus as claimed in claim 11, wherein the optimum value of the duty cycle of the recorded information pattern corresponds to the duty cycle of the signal portion.

13. The apparatus as claimed in claim 12, wherein the desired level of the DC component of the read signal is substantially midway between the values of the first and second signals.

14. An optical recording apparatus for recording a digital information signal on a radiation-sensitive record carrier, the apparatus comprising:
recording means for recording the information signal and a test signal having substantially identical test signal portions, each of which has substantially the same duty cycle, on the record carrier by scanning the record carrier with a write beam, said recording means having switching means for switching the write beam between a low intensity level which is insufficient to bring about a change in optical properties of the record carrier at a scanning location and a high intensity level which is sufficient to bring about a change in optical properties of the record carrier at a scanning location in conformity with the information signal during recording thereof and in conformity with each of the test signal portions during recording thereof, the write beam, as a result of the switching during recording of the test signal portions, producing a recorded test-information pattern of recording areas and intermediate areas which are distinguishable from each other for each of the test signal portions, the average ratio of the lengths of the recording areas and intermediate areas of a recorded test-information pattern in the scanning direction constituting the duty cycle of that recorded test-information pattern, which duty cycle is controllable by the high intensity level of the write beam;

means for setting the high intensity level to a different level when recording each of the test signal portions;

read means for scanning a recorded test-information pattern with a read beam to produce a corresponding read test signal;

an analysis circuit comprising:

means for deriving from a read test signal a first signal having a value indicative of a maximum level of that read test signal and a second signal having a value indicative of a minimum level of that read test signal; and means for combining the first and second signals so as to derive therefrom an analysis signal indicative of deviation of a DC component of that read test signal from a desired level in relation to the values of the first and second signals, such deviation being indicative of deviation of the duty cycle of the corresponding recorded test-information pattern from an optimum value for the recorded test-information patterns; and means for setting at least the high intensity level of the write beam for recording the information signal in dependence upon the analysis signal derived from the read test signal corresponding to the recorded test-information pattern in which the duty cycle thereof substantially conforms with the optimum value for the recorded test-information patterns, whereby the high intensity level of the write beam for recording the information signal is set in accordance with the high intensity level used in recording the test signal portion which produced the recorded test-information pattern in which the duty cycle thereof substantially conforms with the optimum value for the recorded test-information patterns.

15. The apparatus as claimed in claim 14, wherein a recorded test-information pattern comprises first and second subpatterns on the record carrier, the spatial frequency of the second subpatterns being lower than that of the first subpatterns, the number of first subpatterns exceeding the number of second subpatterns, and the dimensions of the subpatterns being such that upon read-out thereof by said read means the signal components of the read test signal produced by the first subpatterns are of lesser amplitude than the signal components thereof produced by the second subpatterns.

16. The apparatus as claimed in claim 14, wherein the test signal is a bivalent test signal, and the apparatus further comprises a control means for recording the bivalent test signal so that the recorded test-information patterns are produced in addressable locations on the record carrier.

17. The apparatus as claimed in claim 16, wherein said control means is adapted to control the apparatus to record the bivalent test signal so that the apparatus test-information patterns are produced in a section of a predetermined area (PCA) of the record carrier which is identified by previously recorded address information, such section following other sections of the area (PCA) in which test-information patterns have not yet been produced.

18. The apparatus as claimed in claim 14, wherein the optimum value for the test-information patterns corresponds to the duty cycle of the test signal portions.

19. The apparatus as claimed in claim 14, wherein said analysis circuit further comprises means for deriving the DC component, and said means for combining is adapted to derive the analysis signal from a combination of the DC component and the sum of the first and second signals.

20. The apparatus as claimed in claim 14, wherein said analysis circuit further comprises means for eliminating the DC component from the read signal prior to derivation of the first and second signals therefrom, and said means for combining is adapted to derive the analysis signal from a ratio of the sum to the difference of the first and second signals.

* * * * *

UNITED STATES PATENT AND TRADEMARK OFFICE
CERTIFICATE OF CORRECTION

PATENT NO. : 5,303,217

DATED : APRIL 12, 1994

INVENTOR(S) : JOHANNES L. BAKX ET AL

It is certified that error appears in the above-indentified patent and that said Letters Patent is hereby corrected as shown below:

Claim 8, column 15, line 46, after "of" insert --a--; delete "a" after "recorded".

Claim 11, column 16, line 8, change "produce" to --bring about--.

line 24, delete "peak";

line 33, change "deriva-" to --deviation--;

line 34, delete "tion".

Claim 17, column 18, line 22, change "apparatus" to --recorded--.

Signed and Sealed this

Eighth Day of November, 1994

Attest:

BRUCE LEHMAN

*Attesting Officer*     *Commissioner of Patents and Trademarks*